United States Patent
Hu et al.

(10) Patent No.: US 7,995,802 B2
(45) Date of Patent: Aug. 9, 2011

(54) APPARATUS AND METHODS FOR VERIFYING IDENTITY USING BIOMETRIC INFORMATION COLLECTED DURING A PRE-ENROLLMENT PHASE

(75) Inventors: Jianying Hu, Bronx, NY (US); Gregory F. Russell, Yorktown Heights, NY (US); Thomas G. Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 11/625,465

(22) Filed: Jan. 22, 2007

(65) Prior Publication Data
US 2008/0175445 A1    Jul. 24, 2008

(51) Int. Cl.
*G06K 9/00* (2006.01)

(52) U.S. Cl. ....... 382/115; 340/5.53; 340/5.83; 713/186

(58) Field of Classification Search .......... 382/115–127; 340/5.1, 5.2, 5.52, 5.53, 5.8–5.86; 356/71; 713/186; 902/3
See application file for complete search history.

(56) References Cited

U.S. PATENT DOCUMENTS

| | | | | |
|---|---|---|---|---|
| 4,724,542 | A * | 2/1988 | Williford | 382/119 |
| 6,182,076 | B1 * | 1/2001 | Yu et al. | 713/186 |
| 6,259,805 | B1 * | 7/2001 | Freedman et al. | 382/124 |
| 7,103,200 | B2 * | 9/2006 | Hillhouse et al. | 382/115 |
| 7,372,979 | B2 * | 5/2008 | Hillhouse et al. | 382/115 |
| 7,454,624 | B2 * | 11/2008 | LaCous | 713/186 |
| 7,509,686 | B2 * | 3/2009 | Checco | 726/27 |
| 7,773,784 | B2 * | 8/2010 | Boult | 382/124 |
| 2002/0154793 | A1 * | 10/2002 | Hillhouse et al. | 382/115 |
| 2003/0217276 | A1 * | 11/2003 | LaCous | 713/186 |
| 2004/0187037 | A1 * | 9/2004 | Checco | 713/202 |
| 2004/0193893 | A1 * | 9/2004 | Braithwaite et al. | 713/186 |
| 2007/0110283 | A1 * | 5/2007 | Hillhouse et al. | 382/115 |
| 2008/0175445 | A1 * | 7/2008 | Hu et al. | 382/118 |
| 2008/0273770 | A1 * | 11/2008 | Kohout | 382/125 |
| 2009/0052747 | A1 * | 2/2009 | Kamiyama et al. | 382/118 |

* cited by examiner

*Primary Examiner* — Aaron W Carter
(74) *Attorney, Agent, or Firm* — Harrington & Smith

(57) ABSTRACT

Apparatus and methods are disclosed for verifying identity using a plurality of biometric samples collected during a pre-enrollment phase, where the plurality of biometric samples concern one or more biometric measures. In one embodiment, the biometric measure comprises an individual's signature, samples of which are collected over a period of time prior to an enrollment procedure. Collecting signatures over a period of time prior to an enrollment procedure allows a more robust signature model to be developed since the signature model will reflect natural, statistically significant, variations that occur over time. During an enrollment procedure, the user then attests to the validity of the signatures collected during the pre-enrollment phase. Valid signatures are used to construct a signature model that will be used to authenticate signatures provided during later transactions. Apparatus and methods of the invention additionally encompass collecting biometric samples of other biometric measures such as, for example, facial appearance, during a pre-enrollment phase.

22 Claims, 2 Drawing Sheets

APPARATUS AND METHODS FOR VERIFYING IDENTITY USING BIOMETRIC INFORMATION COLLECTED DURING A PRE-ENROLLMENT PHASE

TECHNICAL FIELD

The invention generally concerns the field of biometrics and more particularly concerns methods and apparatus for verifying identity using a plurality of samples concerning one or more biometric measures, where the samples are collected during a pre-enrollment phase.

BACKGROUND

Conventional identity verification systems using biometric measures (such as, for example, signatures) to verify identity are typically divided into an enrollment phase and an identity verification phase. During the enrollment phase, an individual provides proof of identity (such as a driver's license) and one or more samples of a biometric measure. In one conventional system, an individual provides a plurality of signature samples. The signature samples are then used to generate a signature model. During later identity verification events, when the user proffers a signature as a form of identification, the signature model created using the signature samples is used to authenticate the signature presented during the identity verification event.

The problem with the conventional model is that values of a particular biometric measure typically vary over time. For example, an individual's signature may vary over time due to stress; posture; time pressure; distractions; fatigue, etc. When the biometric measure is facial appearance, the user's facial appearance may vary over time due to lighting conditions; facial expressions; fatigue; make up; weight gain and loss; hair growth, coloring and barbering, etc. An identity verification system that collects samples of a particular biometric measure at a single setting will not be able to generate a model for the biometric measure that reflects natural and statistically significant variations in the biometric measure. Without samples representing this variation, the system will be subject to higher false reject rates or higher false accept rates (undetected forgeries), or both.

Accordingly, those skilled in the art seek an identity verification system that creates a robust biometric measure model for use in identity verification events. In particular, those skilled in the art seek an identity verification system that creates and uses a biometric measure model that reflects natural and statistically significant variations in a biometric measure without unnecessarily delaying enrollment, or causing additional cost and inconvenience.

SUMMARY OF THE PREFERRED EMBODIMENTS

The foregoing and other problems are overcome, and other advantages are realized, in accordance with the following embodiments of the invention.

A first embodiment of the invention comprises a method for identity verification using at least one biometric measure. In an exemplary embodiment, samples of at least one biometric measure are collected from an individual during a pre-enrollment phase. Then, the plurality of samples of the at least one biometric measure are saved to an electronic database. Next, prior to or during an enrollment phase, the plurality of samples of the at least one biometric measure collected from the individual are retrieved from the electronic database. Then, during the enrollment phase valid samples of the at least one biometric measure are selected from the plurality of samples collected from the individual. The valid samples reflect statistically significant variations in the at least one biometric measure. Next, an authentication model for authenticating samples of the at least one biometric measure is generated using the valid samples of the at least one biometric measure. Then, the authentication model of the at least one biometric measure is used to authenticate a sample of the at least one biometric measure provided during an identity verification even by a person claiming to be the individual who provided the plurality of samples collected during the pre-enrollment phase.

In embodiments of the invention, deciding when to end the pre-enrollment phase and enter the enrollment phase can be made in dependence on many factors. For example, the decision may be based on the number of samples collected; the times of day or year when the samples were collected; the type of device used in collecting the biometric samples; an analysis of the variations apparent in the samples, etc. Each of these factors properly applied either alone or in combination helps to ensure that samples which reflect statistically significant variations of the biometric measure will be available when generating the authentication model for the biometric measure. The method can be used with many biometric measures such as, for example, signatures; facial appearance; voice print; hand geometry (including fingerprints); etc.

A second embodiment of the invention is a signal-bearing medium tangibly embodying a program of machine-readable instructions executable by a digital processing apparatus of a computer system. The program is configured to perform operations for verifying the identity of an individual using at least one biometric measure when executed. In one operation, the program collects a plurality of samples of the at least one biometric measure from an individual a pre-enrollment phase. In another operation the program stores the samples in a database. In a further operation occurring prior to or during the enrollment phase, the program retrieves the plurality of samples of the at least one biometric measure from the database. In yet another operation, the program receives inputs during an enrollment phase identifying certain samples contained in the plurality of samples of the at least one biometric measure as valid samples. In a still further operation, the program detects an identity verification event involving a person claiming to be the individual who provided the plurality of samples of the at least one biometric measure during the pre-enrollment phase. In another operation, the program receives a sample of the at least one biometric measure provided during the identity verification event by the person. In a further operation, the program uses the valid samples of the at least one biometric measure to authenticate the sample provided by the person during the identity verification event. Authentication of the sample verifies that the person providing the sample of the at least one biometric measure during the identity verification event is the individual who provided the plurality of samples during the pre-enrollment phase.

A third embodiment of the invention is a system comprising: a biometric measure sample collection apparatus configured to collect samples of at least one biometric measure from an individual during a pre-enrollment phase; enrollment apparatus configured to identify during an enrollment phase valid samples contained in the plurality of samples of the at least one biometric measure collected from the individual during the pre-enrollment phase; identity verification apparatus configured to verify during an identity verification event identity of a person claiming to be the individual who provided the samples of the at least one biometric measure during the pre-enrollment phase, where identity verification is performed using a biometric measure authentication model created using the valid samples of the at least one biometric measure; and a biometric measure authentication model generation apparatus coupled to the biometric measure sample collection apparatus, enrollment apparatus and identity verification apparatus, the biometric measure authentication model generation apparatus configured to generate the biometric measure authentication model using the valid samples of the at least one biometric measure.

In conclusion, the foregoing summary of the various embodiments of the present invention is exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
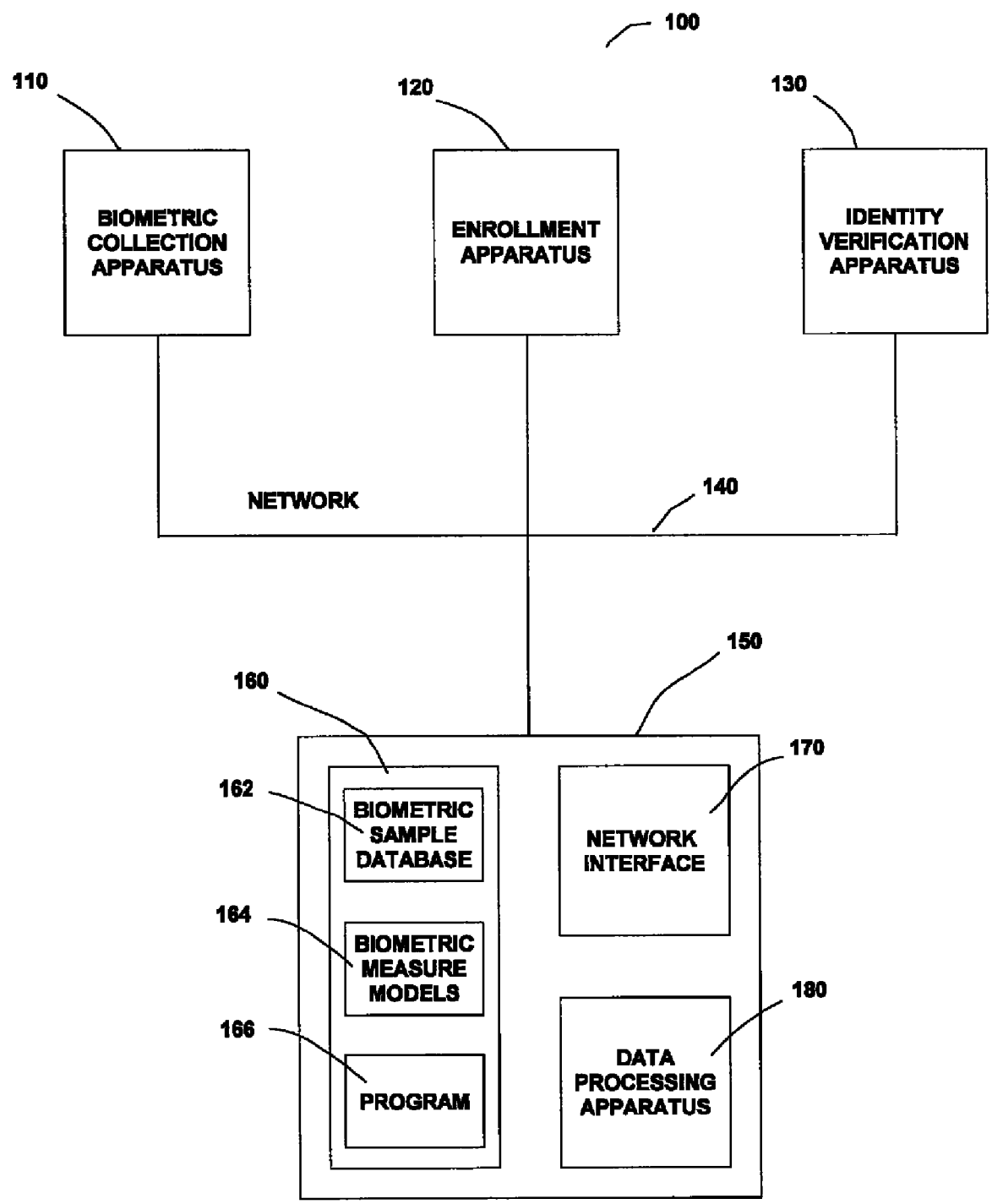
FIG. 1 is a block diagram depicting an embodiment of the invention.

Embodiments of the invention will now be described in greater detail. FIG. 1 depicts a system in accordance with the invention which operates over a network. System 100 comprises a biometric measure sample collection apparatus 110; enrollment apparatus 120; identity verification apparatus 130; and biometric measure authentication model generation apparatus 150.

In the system 100 depicted in FIG. 1, individuals who will be enrolled in a program that requires occasional identity verification agree, either implicitly or explicitly, to provide samples of a biometric measure during a pre-enrollment phase. In one embodiment, the pre-enrollment phase may be of indeterminate length and may continue until, or even after, one or more pre-determined criteria are satisfied. Deciding when to end the pre-enrollment phase and enter the enrollment phase can be made in dependence on many factors. For example, the decision may be based on the times of day, times of week, times of month, or times of year when the samples were collected; the type of device used in collecting the samples; the number of samples collected; an analysis of the variations apparent in the samples; etc. Each of these factors properly applied either alone or in combination helps to ensure that samples which reflect most or all statistically significant variations of the biometric measure will be available when generating the authentication model for the biometric measure. If it is determined that a pre-determined criterion is not satisfied, the pre-enrollment phase continues and additional samples of the biometric measure are collected.

When it is determined that based on satisfaction of one or more pre-determined criteria that the enrollment phase may begin, the individual will be informed that he or she may perform the enrollment tasks. In embodiments dependent on the cooperation of the individual, the pre-enrollment phase may continue and additional samples of the biometric measure will be collected until the enrollment tasks are performed.

In other exemplary embodiments, the duration of the pre-enrollment phase may be pre-determined and selected to be at least as long as a minimum time period during which one would expect that samples collected would reflect most or all statistically significant variations in the biometric measure. This ensures that a statistically robust model of the biometric measure will be created for identity verification purposes. If the duration of the pre-enrollment phase is too short, samples will not reflect typical variations that naturally occur in the biometric measure for the individual. A model created from insufficient data will not be a useful tool for identity verification purposes. Either a built-in tolerance factor will have to be included in the model to compensate for lack of diversity in the sample pool, making it easier to trick the system in later transactions when the model is used to verify identity, or the model will issue too many rejections as values of the biometric measure vary in an expected manner which is nonetheless outside the sample envelope upon which the model is based.

As biometric measure samples are collected, they are transmitted over the network 140 to the biometric measure authentication model generation system 150 where they are stored in the biometric sample database 162. The biometric measure authentication model generation system 150 communicates with the network 140 and biometric collection apparatus through a network interface.

After one or pre-determined criteria are satisfied, or after a time period selected for the pre-enrollment phase has transpired, the individual from whom samples were collected is encouraged to enter the enrollment phase. Alternatively, the individual may initiate the enrollment phase on his or her own volition. Until the activities associated with the enrollment phase are performed, though, the pre-enrollment phase may continue, with additional biometric samples being collected.

During the enrollment phase, an agent responsible for performing the enrollment of the individual interacts with the individual. Typically, the agent examines the samples to see if it is likely that enough samples have been collected to reflect statistically significant variations in the biometric measure. This may be done in consultation with the individual. For example, if the individual knows the types of variations that may occur in the biometric measure, the individual may examine the samples to see if the variations are reflected in the samples. Alternatively, the agent may employ an automated analytical process to see if the samples reflect typical variations in a biometric measure. If known variations are not reflected in the sample set, the enrollment phase may be ended for a return to the pre-enrollment phase where additional samples will be collected. In other embodiments additional samples of the biometric measure are collected at the time of the enrollment. Additional actions may be taken in such circumstances based on a wide variety of criteria to ensure that the sample set for the biometric measure represents statistically significant variations likely to occur in the biometric measure.

At the time of enrollment, the agent additionally asks the individual if any of the samples of the biometric measure gathered during the pre-enrollment phase are invalid. For example, if the biometric measure is a signature, a particular signature sample may be invalid because it was hastily executed. Alternatively, the individual may have been uncomfortable executing the signature, and thus provided an unrepresentative sample. If the biometric measure comprises facial appearance, a sample may be invalid because the individual sported an atypical hairstyle on the day the sample was provided.

The reason why a signature or hairstyle is "atypical", though, is important in deciding whether to eliminate the sample. For example, a signature that is executed with a particular signature entry device may be atypical because the signature entry device was malfunctioning in an exceptionally rare manner. In such an instance the signature sample should be eliminated, since signature samples provided in the future are unlikely to be impacted in the same manner. On the other hand, signature samples that are different from an individual's usual signature because it was uncomfortable for the user to enter the signature with a particular signature entry device may be retained if it is expected that the individual will have to provide samples in the future with the same signature entry device.

Regarding the facial appearance example, an "atypical" hairstyle may have been adopted in preparation for a costume party and, as such, is a one-time occurrence. Since the hairstyle for the costume party is unlikely to be adopted again in the future, the sample set should not reflect it. On the other hand, the hairstyle may only be "atypical" because it is sported less frequently than a more common hairstyle. The "atypical" hairstyle that is nonetheless sported on occasion should be reflected in the sample pool, since it is likely to be repeated. In fact, rejecting samples provided in highly unusual and unlikely-to-be repeated circumstances, but retaining samples impacted by less common, but still significant circumstances, results in a robust model that can be used in a wide range of identity verification scenarios.

In other instances, it is possible that due to clerical error a sample provided during an otherwise valid pre-enrollment transaction may be mislabeled. This can occur when both spouses are being enrolled. In such a situation a sample provided by one spouse may be mislabeled as being provided by the other spouse. Similar mistakes can occur when only one spouse is being enrolled, but both use, for example, a joint credit card and provide signatures during transactions with the joint card.

The agent responsible for conducting the enrollment operation identifies invalid samples electronically by entering selections using enrollment apparatus 120. In one embodiment where the biometric measure comprises a signature, the signatures stored in the biometric sample database 162 would be displayed on a display screen associated with the enrollment apparatus 120. An automated filter may also be used to identify "outliers" which are unlikely to be valid samples. These may be highlighted in some way when presented to the agent, to identify them as suspected invalid samples, or they may simply be automatically rejected by the system. Using an input device associated with the enrollment apparatus 120 the agent would indicate which of the signatures are valid examples and should be used for constructing a signature model for the individual. This information is then communicated by the enrollment apparatus 120 to the biometric measure authentication model generation system 150. The biometric measure authentication model generation system 150 then eliminates the samples of the biometric measure that were identified as not being valid samples. The data processing apparatus 180 executes program 166 and generates an authentication model of the biometric measure for use in verifying the identity of the individual who provided the samples. The program generates the model using the samples identified as valid samples.

Once the authentication model of the biometric measure has been generated, it can be used in verifying the identity of the individual whenever an event requiring identity verification occurs. When such an event occurs, the individual typically provides another sample of the biometric measure, this time to the identity verification apparatus 130. The identity verification apparatus 130 then accesses the biometric measure authentication model generated for the individual from the biometric measure models database 164. The biometric measure sample provided to the identity verification apparatus at the time of the identity verification event is then authenticated using the biometric measure authentication model for the individual.

The embodiment depicted in FIG. 1 is exemplary. For example, the elements comprising the system depicted in FIG. 1 can be arranged in a different manner. In another embodiment, the elements depicted in FIG. 1 can be implemented in an integrated, stand-alone device. Many variations of the embodiment depicted in FIG. 1 are within the scope of the invention.

Figure 2:
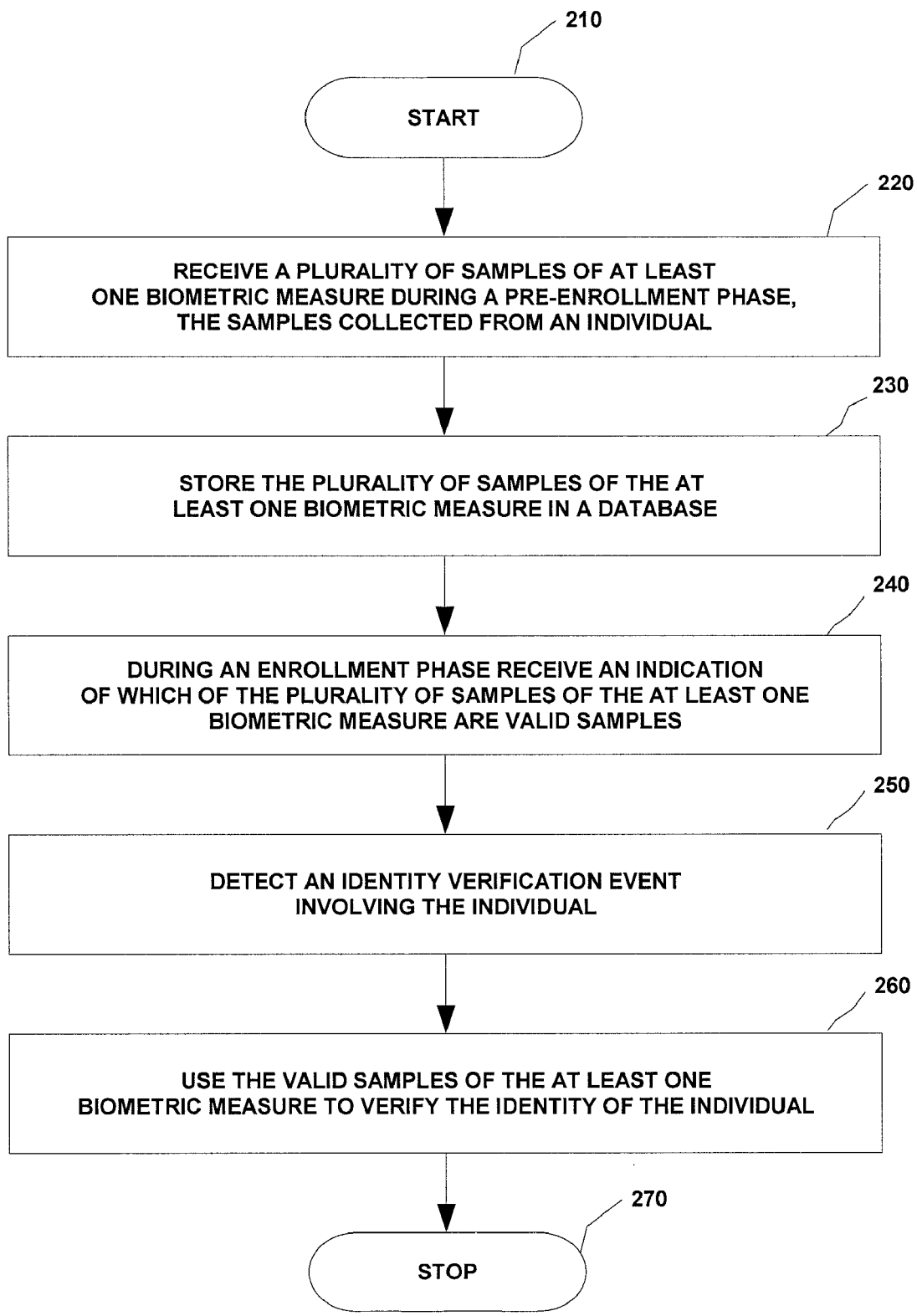
FIG. 2 is a flowchart depicting a method operating in accordance with the invention.

FIG. 2 is a flowchart depicting a method operating in accordance with the present invention. FIG. 2 depicts typical operations that would be performed when a program 166 like that implemented in the system of FIG. 1 is executed. The operations start at step 210. Next, at step 220, a biometric collection apparatus 110 like that depicted in FIG. 1 receives a plurality of samples of at least one biometric measure during a pre-enrollment phase. Then, at step 230, the plurality of samples of the at least one biometric measure are stored in a biometric sample database 162 like that associated with biometric measure authentication model generation system 150 depicted in FIG. 1. Next, at step 240, during an enrollment phase, enrollment apparatus receives indications of which of the plurality samples of the biometric measure provided during the pre-enrollment phase comprise valid samples. This information is communicated to the biometric measure authentication model generation system 150 by the enrollment apparatus 120. Then, at step 250, identity verification apparatus 130 detects an identity verification event. Next, at step 260, the identity verification apparatus 130 uses the valid samples of the at least one biometric measure to verify the identity of an individual representing herself or himself as the person who provided the samples. Typically, the samples are used to authenticate a sample provided at the time of the identity verification event. Authenticating the sample verifies that the person providing the sample is the individual who provided the samples during the pre-enrollment phase. The method completes at step 270.

In one embodiment of the method depicted in FIG. 2, the samples collected from the individual during the pre-enrollment phase and identified as valid during the enrollment phase are used to generate a model of the biometric measure for the individual providing the samples. In such an embodiment, step 260 further comprises receiving another sample of the biometric measure at the time of the identity verification event, and using the model to authenticate the sample and, in turn, the identity of the individual providing the sample at the time of the identity verification event.

In another embodiment of the method depicted in FIG. 2 additional steps are performed during the pre-enrollment phase. Each time an individual submits a sample of the biometric measure during the pre-enrollment phase, further identification measures are employed. For example, the individual may be required to provide one or more forms of identification which are then associated with the sample of the biometric measure. These can then be used in several ways. For example, the identification data can be used to retrieve the biometric samples just prior to, or during, the enrollment phase. In addition, the alternative forms of identification can be used during the enrollment phase to help identity valid biometric samples.

In other embodiments, no alternate forms of identification are collected to help identify the samples of the biometric measure. Instead, a sample of the biometric measure is collected during the enrollment phase. The biometric measure provided during the enrollment phase is then used to search for similar samples in the database.

In a further embodiment of the method depicted in FIG. 3, samples are taken for each of multiple biometric measures during the pre-enrollment phase. Then, during the enrollment phase, valid samples for each of the biometric measures are identified. Next, during an identity verification event, models for each of the biometric measures derived from the samples provided during the pre-enrollment phase are used to authenticate the identity of the individual.

When the biometric measures used comprise signatures, implementation of the invention is straightforward since it would be implemented as an enhancement to existing identification information and signature collection processes, such as credit card processing at retailers. Customers making several credit card transactions a week where a signature is provided during each transaction will find that the invention greatly simplifies the process since the pre-enrollment signatures are executed in a natural way with no undo concern over providing representative samples as would occur in a prior art system where signatures are collected during an enrollment procedure. In the invention, when the customer completes the pre-enrollment phase, there are already a set of signatures on file corresponding to particular transactions. The customer, together with a customer service representative, can simply confirm that these signatures are valid, allowing construction of a signature model that is a much more accurate representation of the statistical variation in the user's signature.

The enrollment model has additional benefits. First, the final enrollment process is simplified and streamlined, as signature collection is not required at that time, except as a possible element of identity verification. Second, the reference signatures are collected in the "real environment" in which verification signatures will be collected. Third, the reference signatures are verified twice-once during the pre-enrollment transaction, and once during the final enrollment verification, thereby reducing the risk of fraudulent enrollment.

Additionally, in establishments where signatures are available from past transactions, on paper or in image form, they can be used to bootstrap the verification process. One or more signature images can be used for static verification of new dynamic signatures. These statistically verified signatures are saved until enough have been collected to create a dynamic enrollment. The enrollment may be used as is, or may be subjected to an additional manual verification process, as described above.

Thus it is seen that the foregoing description has provided by way of exemplary and non-limiting examples a full and informative description of the best apparatus and methods presently contemplated by the inventors for verifying identity using biometric information collected during a pre-enrollment phase. One skilled in the art will appreciate that the various embodiments described herein can be practiced individually; in combination with one or more other embodiments described herein; or in combination with identity verification systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A method comprising:
   during a pre-enrollment phase collecting a plurality of samples of at least one biometric measure from an individual;
   saving the plurality of samples of the at least one biometric measure;
   deciding that an enrollment phase may be initiated upon detecting satisfaction of at least one predetermined criterion;
   informing the individual who provided the samples of the at least one biometric measure collected during the pre-enrollment phase that the individual may proceed with the enrollment phase;
   upon activities associated with the enrollment phase being initiated, discontinuing the pre-enrollment phase;
   prior to or during the enrollment phase, retrieving the plurality of samples of the at least one biometric measure collected from the individual;
   during the enrollment phase selecting valid samples of the at least one biometric measure from the plurality of samples collected from the individual, where the valid samples reflect statistically significant variations in the at least one biometric measure;
   generating, by a biometric measure authentication model generation apparatus, an authentication model of the at least one biometric measure using the valid samples of the at least one biometric measure; and
   using the authentication model of the at least one biometric measure to authenticate a sample of the at least one biometric measure provided during an identity verification even by a person claiming to be the individual who provided the plurality of samples of the at least one biometric measure collected during the pre-enrollment phase.

2. The method of claim 1 where the predetermined criterion comprises at least one selected from the group of: time of day when the samples were collected; time of week when the samples were collected; time of month when the samples were collected; time of year when samples were collected; number of samples collected; types of mechanisms used to collect samples; sample characteristic analysis.

3. The method of claim 1 further comprising:
   prior to the pre-enrollment phase, selecting a time period for the pre-enrollment phase, wherein the time period is of sufficient duration so that samples collected during the time period are expected to reflect statistically significant variations in the biometric measure.

4. The method of claim 1 further comprising:
   during the pre-enrollment phase, examining samples of the biometric measure collected up to the time of the examination to determine whether the samples reflect statistically significant variations in the biometric measure.

5. The method of claim 4 further comprising:
   if as a result of the examination it is determined that a set of samples have been collected which do not reflect statistically significant variations in the biometric measure, continuing the pre-enrollment phase until a collection of samples have been collected which do reflect statistically significant variations in the biometric measure.

6. The method of claim 1 further comprising:
   during the enrollment phase collecting additional samples of the biometric measure until the samples collected during the pre-enrollment and enrollment phases reflect statistically significant variations in the biometric measure.

7. The method of claim 1 where the biometric measure comprises a signature.

8. The method of claim 1 where the biometric measure comprises facial appearance.

9. The method of claim 1 where the biometric measure comprises hand geometry.

10. The method of claim 1 where selecting valid samples of the at least one biometric measure further comprises using a predetermined criterion.

11. The method of claim 1 where selecting valid samples of the at least one biometric measure further comprises asking the individual who provided the samples of the at least one biometric measure which samples accurately reflect likely variations in the at least one biometric measure for the individual.

12. The method of claim 1 where valid samples of the biometric measure are selected using, at least in part, an automated statistical process.

13. The method of claim 1 where collecting a plurality of samples during a pre-enrollment phase further comprises: each time a sample is collected, collecting at least one additional form of identification and associating the additional form of identification with the sample.

14. The method of claim 13 where retrieving the plurality of samples of the at least one biometric measure further comprises using the at least one additional form of identification to retrieve the plurality of samples.

15. The method of claim 13 where selecting valid samples of the at least one biometric measure further comprises using the at least one additional form of identification associated with the samples collected during the pre-enrollment phase to aid in selecting valid samples of the biometric measure.

16. The method of claim 1 where retrieving the plurality of samples of the at least one biometric measure during an enrollment phase further comprises collecting a sample of the at least one biometric measure from the individual during the enrollment phase, and using the sample of the at least one biometric measure collected during the enrollment phase to retrieve the plurality of samples of the at least one biometric measure collected from the individual during the pre-enrollment phase.

17. The method of claim 1 further comprising:
during or before the pre-enrollment phase, accessing a database of samples of the at least one biometric measure collected during prior transactions; and
using the samples collected during the prior transactions to authenticate the samples of the at least one biometric measure collected during the pre-enrollment phase.

18. The method of claim 17 wherein generating an authentication model of the at least one biometric measure further comprises using the samples of the at least one biometric measure collected during transactions prior to the pre-enrollment phase to generate the authentication model.

19. A memory tangibly embodying a program of machine-readable instructions executable by a digital processing apparatus of a computer system to perform operations for verifying identity of an individual using at least one biometric measure, the operations comprising:
during a pre-enrollment phase, collecting from an individual a plurality of samples of the at least one biometric measure;
storing the plurality of samples of the at least one biometric measure in a database;
deciding that an enrollment phase may be initiated upon detecting satisfaction of at least one predetermined criterion;
informing the individual who provided the samples of the at least one biometric measure collected during the pre-enrollment phase that the individual may proceed with the enrollment phase;
upon activities associated with the enrollment phase being initiated, discontinuing the pre-enrollment phase;
retrieving the plurality of samples of the at least one biometric measure from the database;
during the enrollment phase receiving input identifying certain samples contained in the plurality of samples of the at least one biometric measure as valid samples;
detecting an identity verification event involving a person claiming to be the individual who provided the plurality of samples of the at least one biometric measure during the pre-enrollment phase;
receiving a sample of the at least one biometric measure provided during the identity verification event by the person; and
using the valid samples of the at least one biometric measure to authenticate the sample provided by the person during the identity verification event, wherein authentication of the sample verifies that the person providing the sample of the at least one biometric measure during the identity verification event is the individual who provided the plurality of samples during the pre-enrollment phase, where using the valid samples of the at least one biometric measure to authenticate the sample further comprises generating, by a biometric measure authentication model generation apparatus, a biometric measure authentication model using the valid samples, and using the biometric measure authentication model to authenticate the sample provided during the identity verification event.

20. The memory of claim 19 where the biometric measure comprises a signature.

21. The memory of claim 19 where valid samples of the at least one biometric measure are selected during the enrollment phase using, at least in part, an automated statistical process.

22. A system comprising:
a biometric measure sample collection apparatus configured to collect samples of at least one biometric measure from an individual during a pre-enrollment phase and configured to access a database of samples of the at least one biometric measure collected during prior transactions during or before the pre-enrollment phase;
an enrollment apparatus configured to identify during an enrollment phase valid samples contained in the plurality of samples of the at least one biometric measure collected from the individual during the pre-enrollment phase, wherein upon activities associated with an enrollment phase being initiated, the pre-enrollment phase is discontinued;
an identity verification apparatus configured to verify during an identity verification event identity of a person claiming to be the individual who provided the samples of the at least one biometric measure during the pre-enrollment phase, where identity verification is performed using a biometric measure authentication model created using the valid samples of the at least one biometric measure; and
a biometric measure authentication model generation apparatus coupled to the biometric measure sample collection apparatus, enrollment apparatus and identity verification apparatus, the biometric measure authentication model generation apparatus configured to generate the biometric measure authentication model using the valid samples of the at least one biometric measure, wherein the system is configured to use the samples collected during the prior transactions to authenticate the samples of the at least one biometric measure collected during the pre-enrollment phase.

* * * * *